United States Patent
Timmer et al.

(10) Patent No.: US 6,665,920 B2
(45) Date of Patent: Dec. 23, 2003

(54) TRACK-LAYING ASSISTANCE DEVICE

(75) Inventors: Bernard Timmer, Conflans Saint Honorine (FR); Eric Thuillier, Guyancourt (FR)

(73) Assignee: Giat Industries, Versailles (FR)

( * ) Notice: Subject to any disclaimer, the term of this patent is extended or adjusted under 35 U.S.C. 154(b) by 166 days.

(21) Appl. No.: 09/899,291

(22) Filed: Jul. 6, 2001

(65) Prior Publication Data

US 2002/0002927 A1 Jan. 10, 2002

(30) Foreign Application Priority Data

Jul. 7, 2000 (FR) .............................................. 00 08871

(51) Int. Cl.[7] .................................................. B66F 3/00
(52) U.S. Cl. ..................................................... 29/281.5
(58) Field of Search ............................... 29/267, 281.1, 29/281.5, 281.6, 426.5, 148.3, 266, 283, 256, 262; 254/15–17, 131

(56) References Cited

U.S. PATENT DOCUMENTS

| 1,814,892 A |   | 7/1931 | Boyer |
| 4,683,632 A | * | 8/1987 | Kalman ..................... 29/281.1 |
| 5,392,504 A | * | 2/1995 | Calusinski ................. 29/426.6 |
| 5,826,858 A | * | 10/1998 | Gordon ....................... 254/17 |

* cited by examiner

*Primary Examiner*—Robert C. Watson
(74) *Attorney, Agent, or Firm*—Oliff & Berridge, PLC

(57) ABSTRACT

A track-laying assistance device to hold, at ground-level, a raised end of an opened track having pre-angled connectors, wherein the track-laying assistance device comprises a first element fastened to the part of the track held to the ground and a second mobile element able to be dismounted with respect to the first element and able to push back to ground-level a raised end of the track to allow the vehicle to engage in it. The device may be activated mechanically, hydraulically or pneumatically and is applicable to tracked vehicles.

9 Claims, 5 Drawing Sheets

TRACK-LAYING ASSISTANCE DEVICE

BACKGROUND OF THE INVENTION

The technical scope of the invention is that of hand tooling to mount tracks with pre-angled connectors onto vehicles, such as tanks or other tracked vehicles.

The installation of tracks onto a vehicle, called track laying, is often an operation that is both complicated and dangerous. Indeed, tracks with pre-angled connectors used in particular on armored vehicles pose a real problem of installation. Such a track, when opened out and laid on the ground, finds its ends raised from the ground at a height that hinders the track-laying operation. Indeed, the pre-angled connectors at the end of the track exert a pre-angulation tending to raise its ends. In this configuration and with no human intervention to lower them, the vehicle is not able to be engaged without damaging the track. Moreover, the immediate proximity of an operator during the track-laying operation presents a significant risk, indeed should the track break this would cause the propulsion of certain of its elements. It would thus appear necessary to have a system that does not require human intervention.

SUMMARY OF THE INVENTION

The aim of the present invention is thus to provide a device to carry out the track-laying operation without human intervention, by holding the ends of the tracks at ground level thereby allowing the vehicle to engage.

The invention thus relates to a track-laying assistance device to hold at ground-level a raised end of an opened track having pre-angled connectors, wherein it comprises a first element fastened to the part of the track held to the ground and a second mobile element able to be dismounted with respect to said first element and able to push back to ground-level a raised end of the track to allow the vehicle to engage in it.

According to a characteristic of the invention, the second element comprises a lever pivoting with respect to the first element and means to push down the track.

According to another characteristic of the invention, the lever presses on the end of the track and on a shaft integral with the first element.

According to yet another characteristic of the invention, the means to push down the track are of the mechanical, hydraulic or pneumatic type connecting the lever to the first element.

According to yet another characteristic of the invention, the mechanical means to push down the track is constituted by a screw, a pivoting nut and a tightening nut.

According to yet another characteristic of the invention, the first element comprises two flanges, one upper and one lower, connected together by two bolts to block the first element with respect to the track.

According to yet another characteristic of the invention, the lower flange incorporates housings in which the pre-angled connectors of the track are fitted in order to immobilize them with respect to the flanges.

The upper flange is formed so as to accommodate firstly the shaft around which the lever pivots and secondly the means to push down the track.

According to another characteristic of the invention, the assembly formed by:
- the part of the track held at ground-level,
- the raised end of the track, and
- the track-laying assistance device, exerts a greater torque than that of the last pre-angled connector immobilized with respect to the flanges.

A first advantage of the device according to the invention lies in its facilitating the track-laying operation whilst minimizing any possible risk.

Another advantage lies in the substantial reduction in the cost and time required to install the track.

Another advantage lies in the fact that this device, light and of reduced bulk, can be stored in a breakdown tank or in the vehicle itself.

Another advantage lies in the fact that this device can be adapted to different types of tracks.

BRIEF DESCRIPTION OF THE DRAWINGS

Other characteristics, particulars and advantages of the invention will become more apparent after reading the following description, given by way of example in reference to the appended drawings, in which.

DETAILED DESCRIPTION OF PREFERRED EMBODIMENTS

Figure 1:
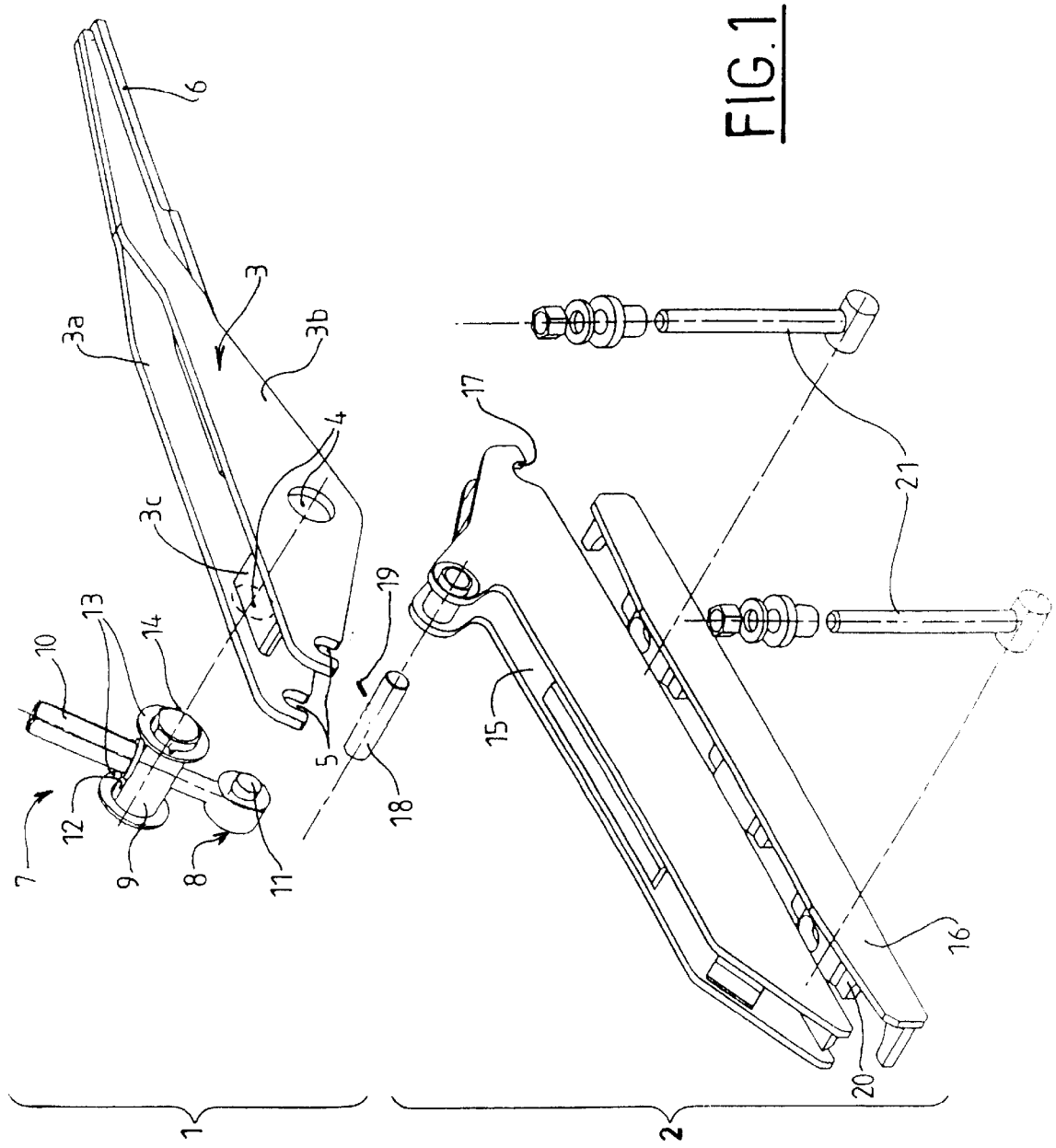
FIG. 1 is an exploded view of the device according to the invention.

FIG. 1 shows an exploded view of the device in which a first element 1 can be seen that is mobile with respect to a second element 2. The first element 1 is constituted by a lever 3 and means 7 to push down the track. The lever 3 has the overall shape of two substantially parallel tapered cheeks 3a and 3b. These two cheeks are spaced at one end by a spacer 3c and are joined at the other end. This assembly 3a, 3b and 3c constitutes the lever 3 and incorporates two holes 4 in its widest part, two notches 5 at one end and a flat part 6 at the opposite end. This flat part 6 is intended to co-operate with the track, it being sufficiently long to hold the lever 3 pressed on the end of the track for as long as this is being pushed down.

The means 7 to push down the track are constituted by a screw 8, a pivoting nut 9 and a tightening nut 10. The screw 8 is threaded at one end to receive the tightening nut 10, and is machined at the other end to delimit two cylindrical snugs 11. The pivoting nut 9 is in the overall shape of a shank through which a hole perpendicular to its axis of rotation has been made so as to provide a passage for the screw 8. Additionally, a flat plat 12 is machined to distribute the forces of the nut 10. The means 7 to push down the track is positioned between the cheeks 3a, 3b of the lever 3, the pivoting nut 9 being positioned in the holes 4. The means 7 to push down the track are held in place by two washers 13 and two pins 14 of a known type.

The second element incorporates two flanges 15, 16, an upper one positioned above the track and another lower one positioned below the track. At one end, the upper flange 15 incorporates two notches 17 shaped to receive the cylindrical snugs 11 of the screw 8. This flange 15 is machined in its widest part so as to receive a shaft 18. The shaft, protruding on either side of the upper flange 15 and held in place by a pin 19, receives the lever 3 pressing on its notches 5. The flange 16 is generally L-shaped. The two flanges 15, 16 are of a substantially equal length, the lower flange 16 comprising housings 20 able to pinch the pre-angled connectors of the track. Moreover, the two flanges 15, 16 are pierced between the housings 20 to allow two bolts 21 to be engaged. The bolts 21 pass through the two flanges 15, 16 and their tightening causes the track to be sandwiched between the flanges.

Figure 2:
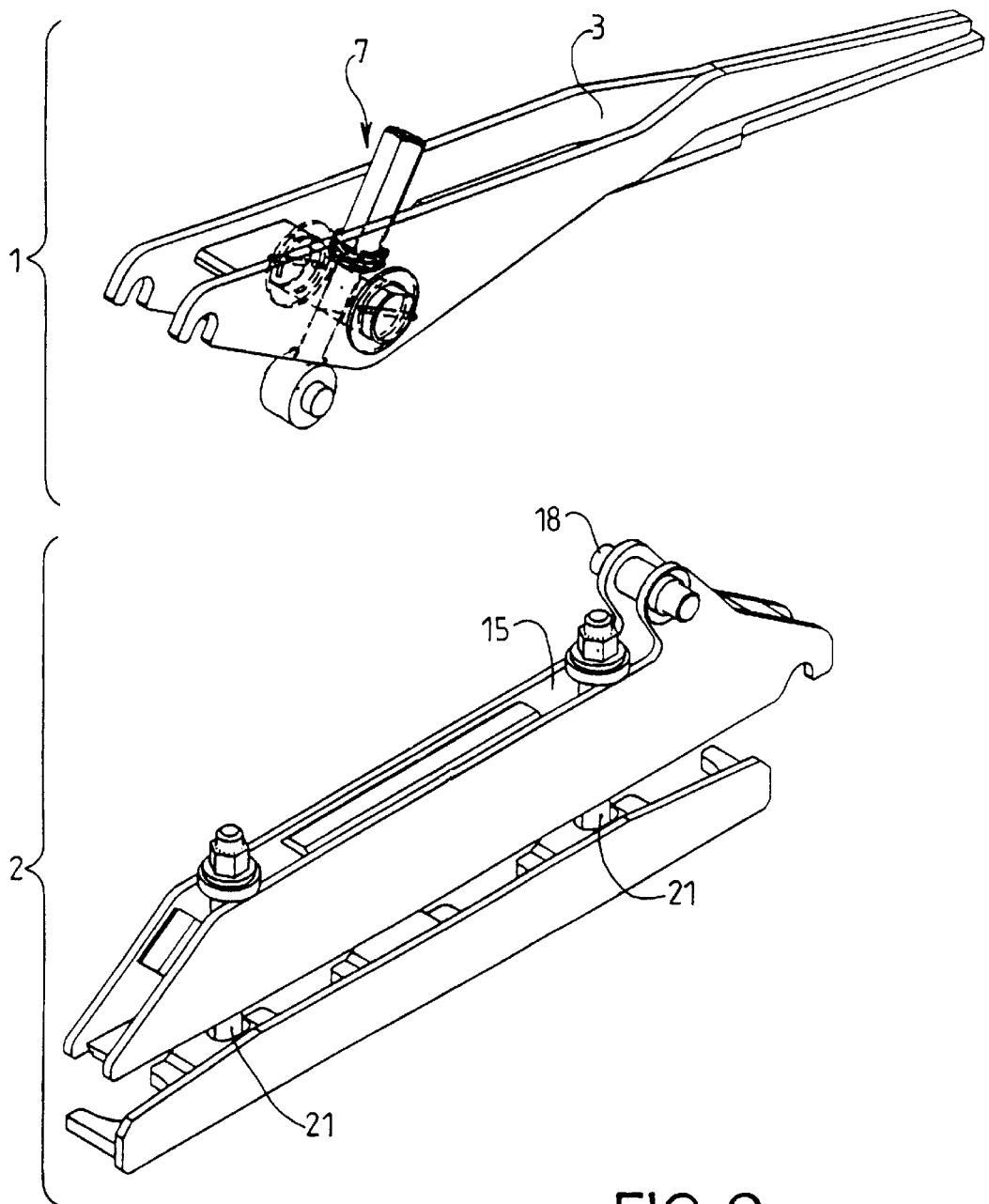
FIG. 2 is a view of the device assembled according to the invention.

FIG. 2 shows the assembled device. Indeed, in the first element 1 we can see that the means 7 to push down the track are positioned in the lever 3 whereas in the second element 2 we can see the assembly of the shaft 18 in the upper flange 15, the upper flange 15 being connected to the lower flange 16 by the bolts 21.

Figure 3:
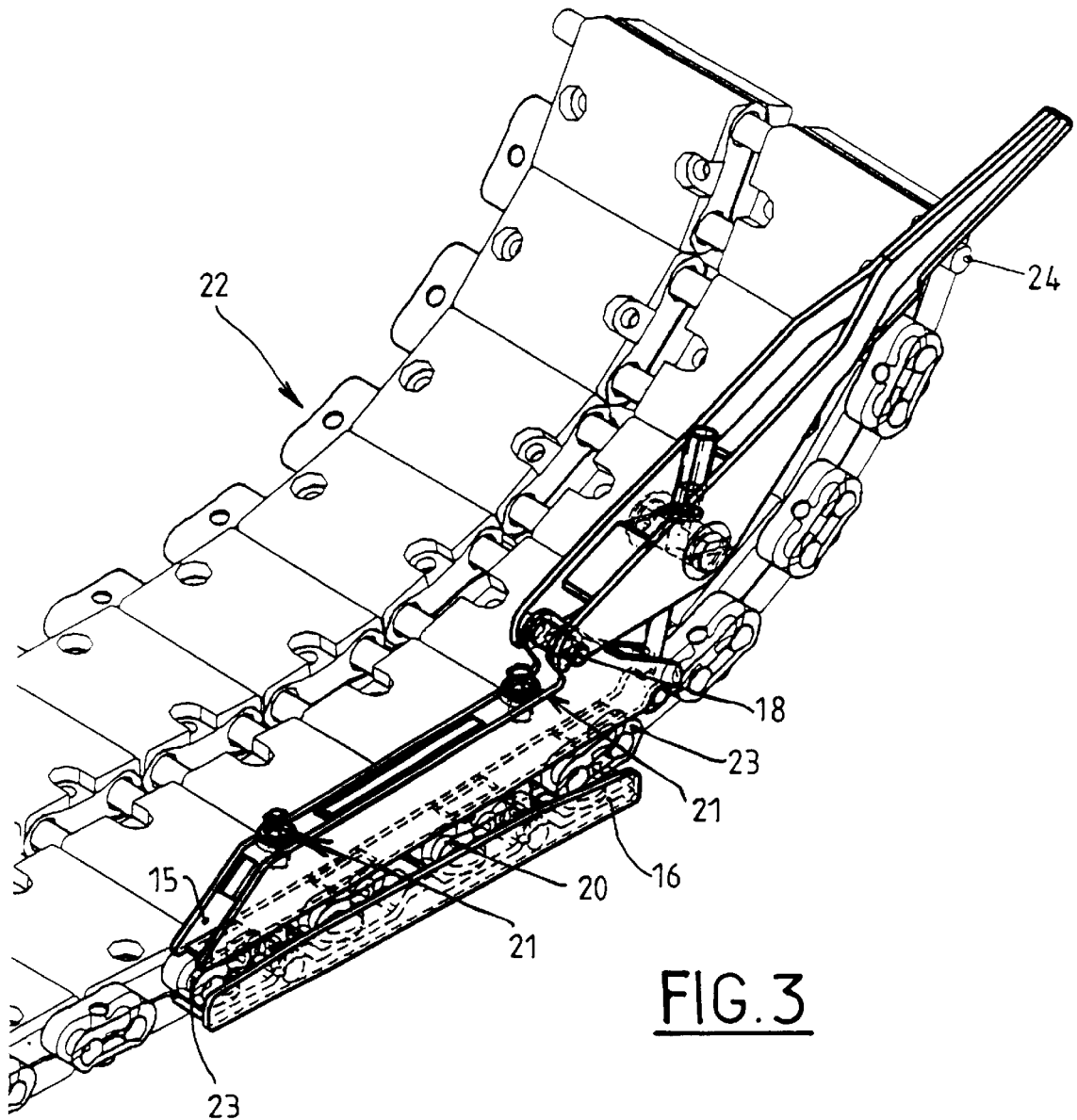
FIG. 3 is a perspective view of the device according to the invention pre-positioned on a track.

FIG. 3 firstly shows the installation of the device according to the invention and secondly the raised end 24 of an open track 22. The upper flange 15 is positioned on one side of the track 22, the lower flange 16 being arranged opposite it. Of course, the pre-angled connectors 23 are fitted into the housings 20 made in the lower flange 16. At the stage in the assembly, these are temporarily held in place by the bolts 21. The first element 1 presses by one side on the shaft 18 by co-operating with the notches 5 and on the other on the free end 24 of the open track 22.

Figure 4:
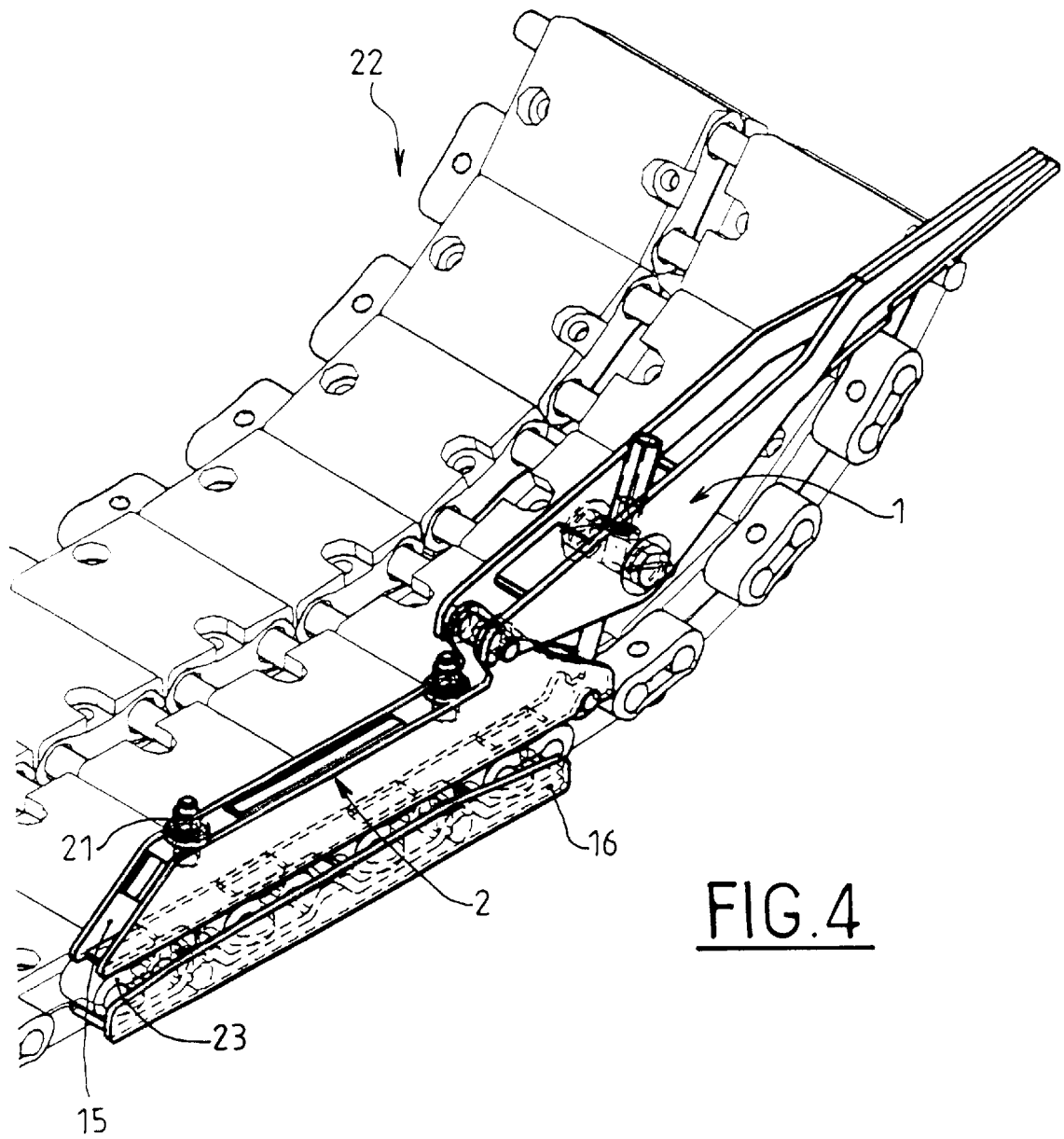
FIG. 4 is a perspective view of the device according to the invention after flanging.

FIG. 4 shows the blocking phase of the two flanges 15 and 16. Indeed, after the bolts 21 have been tightened, the track 22 is sandwiched between these two flanges because of the pre-angled connectors 23 being fitted into the housings 20. The second element 2 and the track 22 are in this case completely integral with one another.

Figure 5:
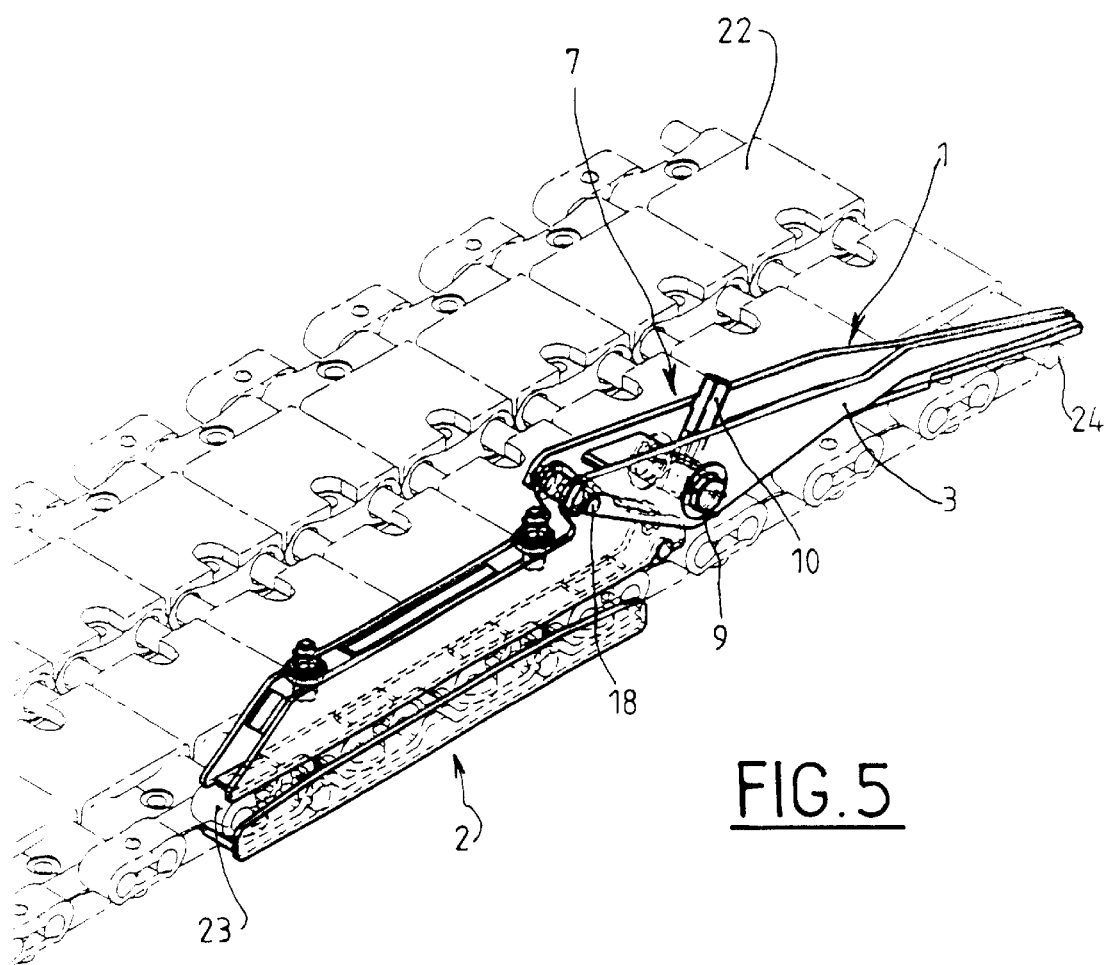
FIG. 5 is a perspective view of the device according to the invention after the end of the track has been held down to the ground.

FIG. 5 shows the last phase of operation of the device. As described previously, the second element is flanged onto the pre-angled connectors 23 of the track 22, the means 7 to push down the track may now be activated. To do this, the pivoting nut 9 is brought nearer the cylindrical snugs 11 of the screw 8 by tightening the nut 10. As the pivoting nut 9 is connected to the lever 3, it causes the lever to pivot around the shaft 18. We can see that the end 24 of the track is still pressing on the flat part 6 of the lever whatever the phase of operation of the device. After the means 7 to push down the track have been fully tightened, the end 24 of said track is down enough. The objective has thus been achieved and the vehicle is able to engage the track. Of course, the means 7 to push down the track as described previously are of a mechanical nature but they may be assisted hydraulically or pneumatically by means of a jack and its control system by replacing the screw 8 and the nut 10 (not shown). The track-laying assistance device is naturally dimensioned so as to counter the forces exerted by the track, which could prevent the end 24 of the track from being successfully lowered. Indeed, the torque exerted by the device and the track is greater than the torque of the last pre-angled connector 23 immobilized between the two flanges 15 and 16 of the second element 2.

By way of illustration, the track-laying assistance device is made on the principle of a mechano-welded structure weighing around 30 kilograms that can be immediately dismounted into two elements, one weighing about twelve kilograms and the other about eighteen kilograms, but does not exclude any other shape, material or assembly principle.

What is claimed is:

1. A track-laying assistance device to hold at ground-level a raised end of an opened track having pre-angled connectors, wherein it comprises a first element fastened to the part of the track held to the ground and a second mobile element able to be dismounted with respect to said first element and able to push back to ground-level a raised end of the track to allow the vehicle to engage in it, wherein the first element comprises two flanges, an upper flange and a lower flange and means to connect the two flanges together with the part of the track held to the ground therebetween.

2. A track-laying assistance device according to claim 1, wherein the second element comprises a lever pivoting with respect to the first element and means to push down the track.

3. A track-laying assistance device according to claim 2, wherein the lever presses on the end of the track and on a shaft integral with the second element.

4. A track-laying assistance device according to claim 2, wherein the means to push down the track are of the mechanical, hydraulic or pneumatic type connecting the lever to the second element.

5. A track-laying assistance device according to claim 4, wherein the mechanical means to push down the track are constituted by a screw, a pivoting nut and a tightening nut.

6. A track-laying assistance device according to claim 1, wherein the means to connect comprises two bolts to block the first element with respect to the track.

7. A track-laying assistance device according to claim 6, wherein the lower flange incorporates housings in which the pre-angled connectors of the track are fitted in order to immobilize them with respect to the flanges.

8. A track-laying assistance device according to claim 6, wherein the upper flange is formed so as to accommodate firstly the shaft around which the lever pivots and secondly the means to push down the track.

9. A track-laying assistance device according to claim 1, wherein an assembly formed by the part of the track held at ground-level, the raised end of the track, and the track-laying assistance device exert a greater torque than that of the last pre-angled connector immobilized with respect to the flanges.

* * * * *